US010399410B2

(12) United States Patent
Cosgrove

(10) Patent No.: US 10,399,410 B2
(45) Date of Patent: Sep. 3, 2019

(54) REDUCTION OF CONDENSATION IN VEHICLE HVAC SYSTEMS

(71) Applicant: Toyota Motor Engineering & Manufacturing North America, Inc., Erlanger, KY (US)

(72) Inventor: David W. Cosgrove, Royal Oak, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 144 days.

(21) Appl. No.: 15/070,179

(22) Filed: Mar. 15, 2016

(65) Prior Publication Data
US 2017/0267067 A1 Sep. 21, 2017

(51) Int. Cl.
*B60H 1/00* (2006.01)
*B60H 1/32* (2006.01)

(52) U.S. Cl.
CPC ..... *B60H 1/00849* (2013.01); *B60H 1/00778* (2013.01); *B60H 2001/3238* (2013.01); *B60H 2001/3261* (2013.01); *B60H 2001/3263* (2013.01); *B60H 2001/3266* (2013.01); *B60H 2001/3282* (2013.01)

(58) Field of Classification Search
CPC ................ B60H 1/3233; B60H 1/3227; B60H 1/00849; B60H 2001/3238; B60H 2001/3282; B60H 2001/3266; B60H 2001/3263; B60H 2001/3261
See application file for complete search history.

(56) References Cited

U.S. PATENT DOCUMENTS

| | | | |
|---|---|---|---|
| 5,899,082 A * | 5/1999 | Stein ...................... | A61L 9/122 62/133 |
| 6,052,998 A | 4/2000 | Dage et al. | |
| 6,840,051 B1 | 1/2005 | Stein | |
| 7,637,031 B2 | 12/2009 | Salim et al. | |
| 2011/0067422 A1* | 3/2011 | Ichishi ................. | B60H 3/0085 62/176.1 |
| 2012/0198863 A1* | 8/2012 | Hall ...................... | F25D 21/006 62/80 |

(Continued)

*Primary Examiner* — Larry L Furdge
(74) *Attorney, Agent, or Firm* — Christopher G. Darrow; Darrow Mustafa PC

(57) ABSTRACT

A vehicle heating, ventilating, and air conditioning (HVAC) system can be configured to reduce and/or prevent condensation build up on one or more elements of the system. Subsequent to a power state of the vehicle being switched from an active state to an inactive state, a fresh mode air source can be selected as an intake for a blower. It can be determined whether an ambient temperature is greater than or equal to a predetermined temperature. It can then be determined whether the compressor was in operation prior to the vehicle having been switched from the active state to the inactive state. It can be determined whether a temperature of an evaporator of the HVAC system is rising. If it is determined that the ambient temperature is greater than or equal to the predetermined temperature value, that the compressor was in operation prior to the vehicle having been switched from the active state tot eh inactive state, and that the temperature of the evaporator is rising, a blower can be activated to blow air from the fresh mode air source across the evaporator.

19 Claims, 3 Drawing Sheets

(56) References Cited

U.S. PATENT DOCUMENTS

2014/0116076 A1 5/2014 Kato et al.
2014/0305143 A1* 10/2014 Kwon .................. F25B 49/005
62/56

* cited by examiner

REDUCTION OF CONDENSATION IN VEHICLE HVAC SYSTEMS

FIELD

The subject matter described herein relates in general to vehicle air conditioning systems and, more particularly, to the reduction of condensation within such air conditioning systems.

BACKGROUND

Vehicles can include air conditioning systems to cool an interior passenger compartment. Such air conditioning systems can cycle a refrigerant fluid through a refrigeration cycle. For example, a compressor can be powered by a vehicle powertrain and used to compress refrigerant vapor to a higher pressure. The compressed refrigerant can be routed through a condenser, where the refrigerant can be cooled. The cooled refrigerant can be routed to an evaporator where the liquid refrigerant evaporates back to a vapor state as the refrigerant receives heat from air blown by a blower. During the use of the air conditioning system, condensation can collect on one or more surfaces of elements of the refrigeration cycle, such as on exterior surfaces of the evaporator.

SUMMARY

In one respect, the present disclosure is directed to a method of reducing condensation within a heating, ventilating, and air conditioning (HVAC) system in a vehicle, the HVAC system including a compressor, an evaporator, and a blower. The method can include determining whether a power state of the vehicle has been switched from an active state to an inactive state. Responsive to determining that the power state of the vehicle has been switched from the active state to the inactive state, the method can cause a fresh mode air source to be selected for an intake of the blower. It can be determined whether an ambient temperature is greater than or equal to a predetermined temperature value. It can then be determined whether a compressor was in operation prior to the vehicle having been switched from the active state to the inactive state. The method can include determining whether a temperature of the evaporator is rising. Responsive to determining that the ambient temperature is greater than or equal to the predetermined temperature value, that the compressor was in operation prior to the vehicle having been switched from the active state to the inactive state, and that the evaporator temperature is rising, the method can cause the activation of a blower to blow air across an evaporator.

In another respect, the present disclosure is directed to a method of reducing condensation within a heating, ventilating, and air conditioning (HVAC) system in a vehicle that has been switched to an inactive state, the HVAC system including a compressor, an evaporator, and a blower. The method can include causing an intake mode switch to select a fresh mode air source intake for the HVAC system. It can be determined whether an ambient temperature is greater than or equal to a predetermined temperature value using data acquired from at least one ambient temperature sensor. The method can include determining whether the compressor was in operation prior to the vehicle being switched to the off state. It can be determined whether a temperature of the evaporator is rising. Responsive to determining that the ambient temperature is greater than or equal to the predetermined temperature value, that the compressor was in operation prior to the vehicle being switched to the inactive state, and that the temperature of the evaporator, the method can cause a blower to be alternated between active periods and inactive periods for a predetermined duration, where air from the fresh air source is blown across the evaporator during the active periods.

In yet another respect, the present disclosure is directed to a vehicle heating, ventilating, and air conditioning (HVAC) system operable to reduce condensation within the HVAC system after a vehicle is turned to an inactive power state. The system can include a sensor system operable to sense an ambient temperature and to sense an evaporator temperature. The system can also include an intake mode switch to select a source of air for the HVAC system, a compressor operable to increase a pressure of a refrigerant, an evaporator, and a blower operable to blow air across the evaporator. The system can include a controller operatively connected to the sensor system. The controller can be programmed to initiate executable operations. For example, the executable operations can include causing the intake mode switch to select a fresh mode air source, determining whether the ambient temperature is greater than or equal to a predetermined temperature value, determining whether the compressor was in operation prior to the vehicle being turned to the inactive state, and determining whether the evaporator temperature is rising. Responsive to determining that the ambient temperature is greater than or equal to the predetermined temperature value, that the compressor was in operation prior to the vehicle being switched to the inactive state, and that the evaporator temperature is rising, the controller can cause the blower to be activated.

DETAILED DESCRIPTION

This detailed description relates to the operation of a vehicle heating, ventilating, and air conditioning (HVAC) systems to reduce and/or eliminate the presence of condensation on one or more elements of the HVAC system. Subsequent to a power state of the vehicle being switched from an active state to an inactive state, a fresh mode air source can be selected as an intake for a blower. It can be determined whether an ambient temperature is greater than or equal to a predetermined temperature. It can then be determined whether the compressor was in operation prior to the vehicle having been switched from the active state to the inactive state. It can be determined whether a temperature of an evaporator of the HVAC system is rising. If it is determined that the ambient temperature is greater than or equal to the predetermined temperature value, that the compressor was in operation prior to the vehicle having been switched from the active state to the inactive state, and that the temperature of the evaporator is rising, a blower can be activated to blow air from the fresh mode air source across the evaporator. The present detailed description relates to systems and methods that incorporate one or more of such features. In at least some instances, such systems and methods can reduce the presence of odor-causing condensation within the HVAC system.

Figure 2:
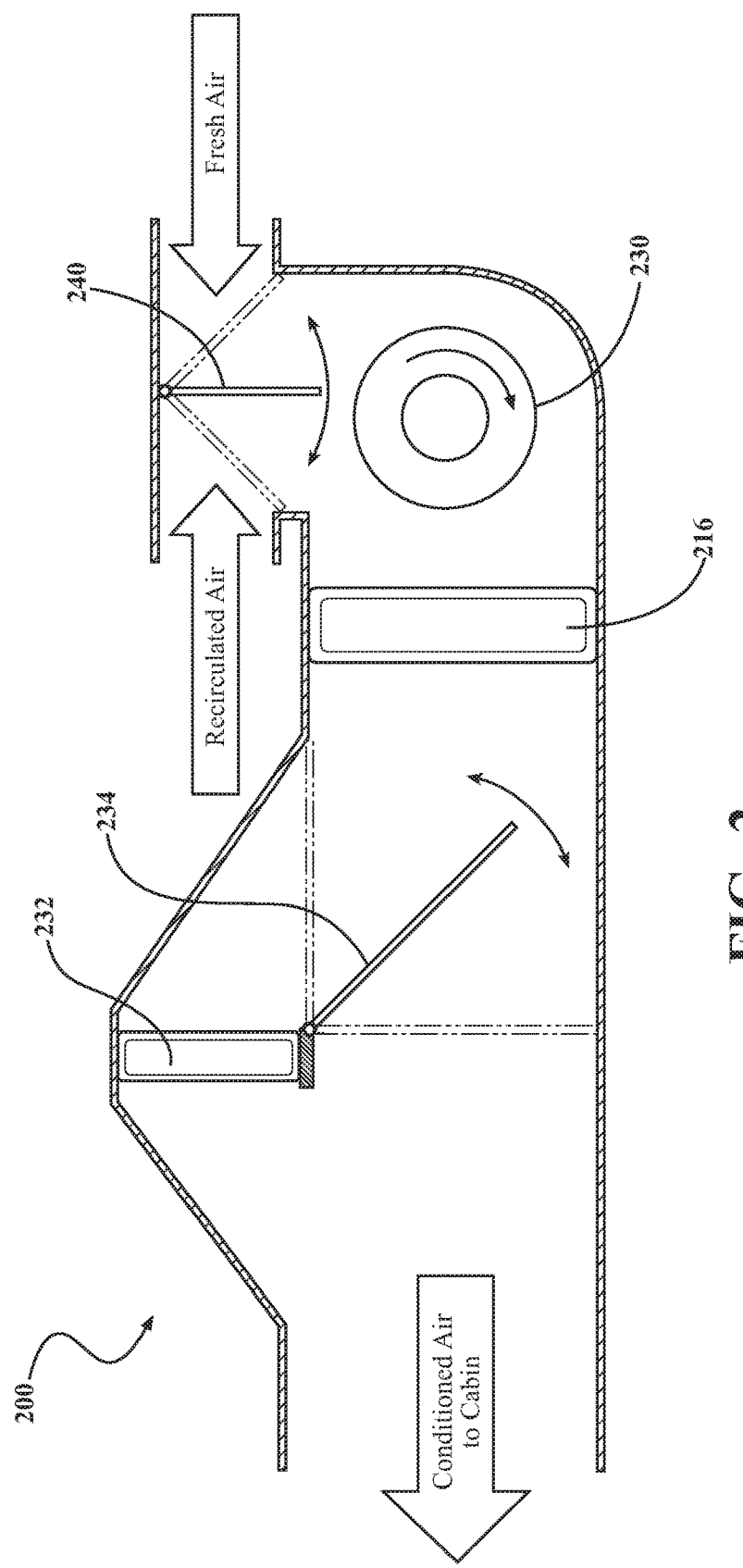
FIG. 2 is an example of a heating, ventilating, and air conditioning system.
Figure 3:
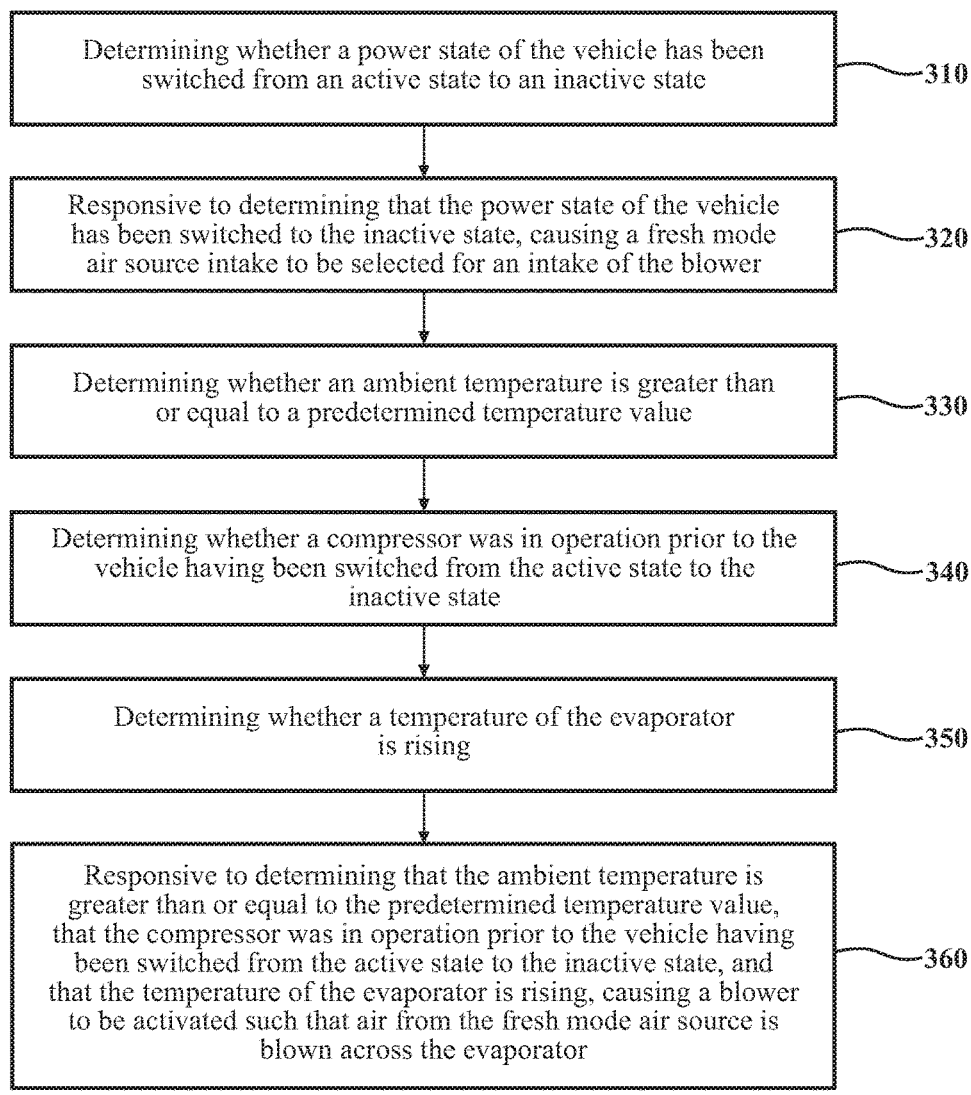
FIG. 3 is an example of a method of operating a heating, ventilating, and air conditioning system to reduce condensation within the system.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
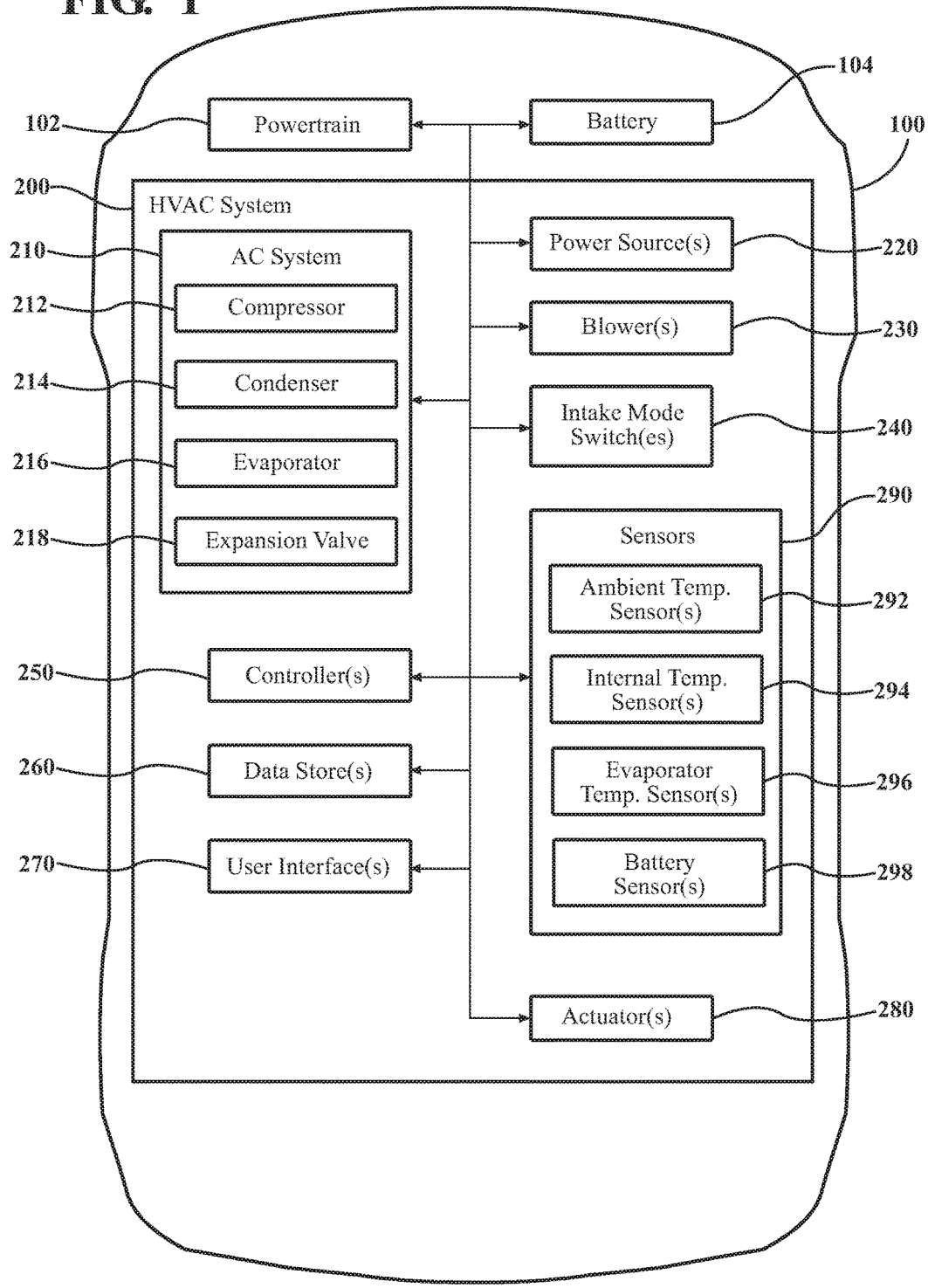
FIG. 1 is an example of a vehicle having a heating, ventilating, and air conditioning system.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft or any other form of motorized transport.

Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The vehicle 100 can include a powertrain 102 to generate power. As used herein, "powertrain" can include any component or group of components of the vehicle 100 that generates and/or transfers power used by the vehicle 100 for movement. In one or more arrangements, the powertrain 102 can include an engine and an energy source to generate power. The engine can be any suitable type of engine or motor, now known or later developed. For instance, the engine can be an internal combustion engine, an electric motor, a steam engine, and/or a Stirling engine, just to name a few possibilities. In some embodiments, the engine can include a plurality of engine types. For instance, a gas-electric hybrid vehicle can include a gasoline engine and an electric motor.

The energy source can be any suitable source of energy that can be used to at least partially power the engine. The engine can be configured to convert energy from the energy source into mechanical energy. Examples of energy sources include gasoline, diesel, propane, hydrogen, other compressed gas-based fuels, ethanol, solar panels, batteries, and/or other sources of electrical power. Alternatively or in addition, the energy source can include fuel tanks, batteries, capacitors, and/or flywheels. In some embodiments, the energy source can be used to provide energy for other systems of the vehicle 100.

The vehicle 100 can include battery 104 to store electrical energy for the vehicle 100. The battery 104 can provide electrical energy to power a variety of vehicle systems. For instance, the battery 104 can power a vehicle ignition system, lights, on-board electronics, as well as any other electronic device connected within the vehicle 100. In one or more arrangements, the battery 104 can be a lead-acid battery including six 2.1 volt cells to provide a nominally 12-volt battery system. The battery 104 can be configured for recharging by an engine of the powertrain 102. In one or more arrangements, the battery 104 can provide an energy source for the powertrain 102.

The vehicle 100 can include a heating, ventilating, and air conditioning (HVAC) system 200. The HVAC system 200 can be configured to change the environment or climate of an interior compartment of the vehicle 100. Some of the possible elements of the HVAC system 200 are shown in FIG. 1 and will be described. It will be understood that it is not necessary for the HVAC system 200 to have all of the elements shown in FIG. 1 or described herein. The HVAC system 200 can have any combination of the various elements shown in FIG. 1. Further, the HVAC system 200 can have additional elements to those shown in FIG. 1.

The HVAC system 110 can include an air conditioning (AC) system 210. The AC system can have any configuration to allow for cooling and/or humidity control for at least a portion of the vehicle 100. In one or more arrangements, the AC system 210 can include a refrigerant (not shown), a compressor 212, a condenser 214, an evaporator 216, and/or an expansion valve 218. Further, the AC system 210 can have additional elements to those shown in FIG. 1. In some arrangements, the AC system 210 may not include one or more of the elements shown in FIG. 1. The various elements of the AC system 210 can be arranged in any suitable manner and/or can be operatively connected to each other in any suitable manner.

The compressor 212 can be configured to direct or facilitate the movement of refrigerant throughout the AC system 210. In one or more arrangements, the compressor 212 can increase the pressure of the refrigerant vapor, such as by reducing a volume of the vapor. The higher pressure of the refrigerant vapor can increase the temperature of the refrigerant.

The compressor 212 can have any suitable configuration for the AC system 210. As non-limiting examples, the compressor 212 can include a rotary compressor, a reciprocating compressor, a centrifugal compressor, and/or an axial compressor. The compressor 212 can be powered by any suitable power source within the vehicle 100. In one or more arrangements, the compressor 212 can be powered by the powertrain 102. For example, a belt can be used to transfer rotational energy from the engine to the compressor 212. Alternatively or in addition, the compressor 212 can be powered by an electric motor powered by the battery 104.

The condenser 214 can be configured to cool and condense the refrigerant to a liquid state. The condenser 214 can have any suitable configuration for the AC system 210. In one or more arrangements, the condenser 214 be any form of a heat exchanger. For example, the condenser 214 can include coiled tubing. In some arrangements, fins can be connected to the tubing to increase a surface area of a material that is in contact with the refrigerant. In one or more arrangements, the condenser 214 can be configured to allow a fluid, such as air, to be directed through the condenser 214. For example, a fan can be operated in close proximity to the condenser to blow air across the coils and/or fins.

The evaporator 216 can be configured to allow and/or cause the transition of a refrigerant from a liquid state to a gaseous state. The evaporator 216 can allow heat transfer between the refrigerant and air surrounding the evaporator 216. In one or more arrangements, the evaporator 216 can include coiled tubes for the refrigerant to be routed through. Hotter air can be blown across the evaporator 216. In one or more arrangements, the air moving across the evaporator 216 heats the refrigerant to a warmer temperature and ultimately evaporating the refrigerant from a liquid state to a gaseous state. The air being blown across the evaporator 216 can be cooled and routed into the passenger compartment of the vehicle 100.

In one or more arrangements, the evaporator 216 can collect condensation at exterior surfaces during the operation of AC system 210. For instance, as the refrigerant cools within the evaporator 216, moisture from air around the evaporator 216 can condense on the exterior surface(s) of the evaporator 216.

The expansion valve 218 can be configured to facilitate change in pressures of the refrigerant. For instance, the expansion valve 218 can be located between the condenser 214 and the evaporator 216. In one or more arrangements, the expansion valve 218 can be configured to allow the liquid refrigerant to undergo an abrupt decrease in pressure and decrease in temperature as the refrigerant moves from the condenser 214 to the evaporator 216.

The HVAC system 200 can include one or more power sources 220 to provide mechanical or electrical power to one or more elements of the HVAC system 200. In one or more arrangements, the power source(s) 220 can include the battery 104. Alternatively or in addition, the power source(s) 220 can include other power sources. For example, the power source(s) 220 can include additional batteries and/or generators.

The HVAC system 200 can include one or more blowers 230 to direct and/or cause the movement of air or other fluid/gas. As used herein, "air" can include any gaseous fluid. For example, air can include environmental gas in and/or around the vehicle 100. The blower(s) 230 can be configured to direct and/or cause the movement of air into a passenger compartment of the vehicle 100. In one or more arrangements, the blower(s) 230 can be configured to move air across the evaporator 216 when the AC system 210 is being operated. In one or more arrangements, the blower(s) 230 can include a blower motor and one or more fans to move a quantity of air past the evaporator 216 and through air ducts into the passenger compartment of the vehicle 100. For instance, the blower(s) 230 can direct air over tubing and/or coils of the evaporator 216 to allow the refrigerant flowing through the evaporator 216 to remove heat from the air. In one or more arrangements, the blower(s) 230 can be powered by the powertrain 102, the battery 104, and/or the power source(s) 220.

The HVAC system 200 can include one or more intake mode switches 240 to control the source of air being introduced to the HVAC system 200 and/or the vehicle 100. In one or more arrangements, the intake mode switch(es) 240 can be configured to allow the selection of a source of air being introduced to the blower(s) 230. For instance, the source of air can be outside of a passenger compartment and/or outside of the vehicle 100, referred to as "fresh mode air source". Additionally, the source of air can be within the passenger compartment, referred to as "recirculation mode air source." In one or more arrangements, the intake mode switch(es) 240 can be operated to change the air source selection between a fresh mode air source, a recirculation mode air source, and/or a mix of both modes.

The HVAC system 200 can include one or more controllers 250. "Controller" means any component or group of components that are configured to execute any of the processes described herein or any form of instructions to carry out such processes or cause such processes to be performed. The controller(s) 250 may be implemented with one or more general-purpose and/or one or more special-purpose processors. Examples of suitable controllers include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a processor. The controller(s) 250 can include at least one hardware circuit (e.g., an integrated circuit) configured to carry out instructions contained in program code. In arrangements in which there is a plurality of controllers 250, such controllers can work independently from each other or one or more controllers can work in combination with each other.

The controller 250 can be configured to cause, directly or indirectly, one or more elements of the HVAC system 200 to be activated or deactivate. As used herein, "cause" or "causing" means to make, force, compel, direct, command, instruct, and/or enable an event or action to occur or at least be in a state where such event or action may occur, either in a direct or indirect manner. In one or more arrangements, the controller(s) 250 can be an HVAC electronic control unit (ECU).

The HVAC system 200 can include one or more data stores 260 for storing one or more types of data. The data store 260 can include volatile and/or non-volatile memory. Examples of suitable data stores 260 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 260 can be a component of the controller(s) 250, or the data store 260 can be operatively connected to the controller(s) 250 for use thereby. The term "operatively connected," as used throughout this description, can include direct or indirect connections, including connections without direct physical contact. In one or more arrangements, the data store(s) 260 can include instructions to allow the controller 250 to operate one or more elements of the HVAC system 110.

The HVAC system 200 can include one or more user interface(s) 270. In one or more arrangements, the user interface(s) 270 can include an input system and/or an output system. An "input system" includes any device, component, system, element or arrangement or groups thereof that enable information/data to be entered into a machine. The input system can receive an input from a vehicle occupant (e.g. a driver or a passenger). Any suitable input system can be used, including, for example, a keypad, display, touch screen, multi-touch screen, button, joystick, mouse, trackball, microphone and/or combinations thereof. An "output system" includes any device, component, system, element or arrangement or groups thereof that enable information/data to be presented to a vehicle occupant (e.g. a person, a vehicle occupant, etc.). The output system can present information/data to a vehicle occupant. The output system can include a display. Alternatively or in addition, the output system may include a microphone, earphone and/or speaker. Some components of the vehicle 100 may serve as both a component of the input system and a component of the output system. In one or more arrangements, the user interface(s) 270 can include a vehicle head unit.

The vehicle 100 can include one or more actuators 280. The actuators 280 can be any element or combination of elements operable to modify, adjust and/or alter one or more components of the HVAC system 200 and/or the vehicle 100 responsive to receiving signals or other inputs from the controller(s) 250. Any suitable actuator can be used. For instance, the one or more actuators 280 can include motors, pneumatic actuators, hydraulic pistons, relays, solenoids, and/or piezoelectric actuators, just to name a few possibilities.

The HVAC system 200 can include one or more sensors 290. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which there are a plurality of sensors 290, the sensors can work independently from each other. Alternatively, two or more of the sensors can work in combination with each other. In such case, the two or more sensors can form a sensor network. The sensors 290 can be operatively connected to the controller(s) 250, the data store(s) 260, and/or other element of the HVAC system 200 (including any of the elements shown in FIG. 1). The sensors 290 can include any suitable type of sensor. Various examples of different types of sensors will be described herein. However, it will be understood that the embodiments are not limited to the particular sensors described.

The sensors 290 can include one or more ambient temperature sensors 292. The ambient temperature sensor(s) 292 can be configured to sense an ambient temperature outside of the vehicle 100. As used herein, "ambient temperature" includes the air temperature of at least a portion of the surrounding environment of the vehicle 100. For instance, the ambient temperature can be the air temperature near an exterior portion of the vehicle 100. The ambient temperature sensor(s) 292 can be any suitable sensor, including mechanical, electrical, and/or integrated circuit temperature sensors that can detect, determine, assess, monitor, measure, quantify, and/or sense an ambient temperature. For example, the ambient temperature sensor(s) 292 can include a mechanical thermometer, a bimetal sensor, a thermistor, a thermocouple, a resistance thermometer, and/or a silicon bandgap sensor. In one or more arrangements, the ambient temperature sensor(s) 292 can be at least partially located at, on, or proximate to an exterior surface of the vehicle 100. In some arrangements, the ambient temperature sensor(s) 292 can be separate from the vehicle 100. For instance, the vehicle 100 can receive signals from an exterior ambient temperature sensor 292. In some examples, the vehicle can receive ambient temperature information from a weather service, a remote server, or application software.

The sensors 290 can include one or more internal temperature sensors 294. The internal temperature sensor(s) 294 can be configured to detect, determine, assess, monitor, measure, quantify, and/or sense an internal temperature of the vehicle 100. "Internal temperature" means an air temperature of at least a portion of a passenger compartment of a vehicle. The internal temperature sensor(s) 294 can be any suitable sensor, including mechanical, electrical, and/or integrated circuit temperature sensors. For example, the internal temperature sensor(s) 294 can include a mechanical thermometer, a bimetal sensor, a thermistor, a thermocouple, a resistance thermometer, and/or a silicon bandgap sensor.

The sensors 290 can include one or more evaporator temperature sensors 296 to detect, determine, assess, monitor, measure, quantify, and/or sense a temperature of at least a portion of the evaporator 216 of the AC system 210. The evaporator temperature sensor(s) 296 can be any suitable sensor, including mechanical, electrical, and/or integrated circuit temperature sensors. For example, the evaporator temperature sensor(s) 296 can include a mechanical thermometer, a bimetal sensor, a thermistor, a thermocouple, a resistance thermometer, and/or a silicon bandgap sensor. In one or more arrangements, the evaporator temperature sensor(s) 296 can be configured to be in direct physical contact with a portion of the evaporator 216. For instance, the evaporator temperature sensor(s) 296 can sense the temperature of an interior and/or exterior surface of the evaporator 216. Alternatively or in addition, the evaporator temperature sensor(s) 296 can be spaced from the evaporator 216. The evaporator temperature sensor(s) 296 can be provided in one or more locations relative to the evaporator 216. In some arrangements, the evaporator temperature sensor(s) 296 can be provided at a portion of the evaporator 216 known to have the coldest temperature.

The sensors 290 can include one or more battery sensors 298 to detect, determine, assess, monitor, measure, quantify, and/or sense one or more conditions of the battery 104. For example, the battery sensor(s) 298 can be configured to determine a voltage of the battery 104, current from a battery, etc. The battery sensor(s) 298 can include any suitable sensor. For example, the battery sensor(s) 298 can be a capacitive voltage sensor.

Referring now to FIG. 2, a portion of the HVAC system 200 can be shown. In one or more arrangements, the intake mode switch 240 can move to allow recirculated air and/or fresh air into the system. For example, the intake mode switch 240 can include a door that is movable between a first position that allows only fresh air to the blower 230, and a second position that allows only recirculated air to the blower 230. In one or more arrangements, the blower 230 can be activated to move air towards and through the evaporator 216. In one or more arrangements, the HVAC system 200 can include a heater core 232 to heat air traveling to the interior of the vehicle 100. An air mix door 234 can be included in the HVAC system 200 to direct air towards or away from the heater core 232.

Now that the various potential systems, devices, elements and/or components of the vehicle 100 have been described, various methods to reduce condensation within an HVAC system will now be described. Referring now to FIG. 3, an example of a method of reducing condensation is shown. Various possible steps of method 300 will now be described. The method 300 illustrated in FIG. 3 may be applicable to the embodiments described above in relation to FIG. 1, but it is understood that the method 300 can be carried out with other suitable systems and arrangements. Moreover, the method 300 may include other steps that are not shown here, and in fact, the method 300 is not limited to including every step shown in FIG. 3. The steps that are illustrated here as part of the method 300 are not limited to this particular chronological order. Indeed, some of the steps may be performed in a different order than what is shown and/or at least some of the steps shown can occur simultaneously.

At block 310, it can be determined whether a power state of the vehicle 100 has been switched from an active state to an inactive state. As used herein, "active state" can include any conditions in which the powertrain 102 can be operable to power the vehicle 100. For example, the active state can include conditions of the vehicle 100 in which an engine is running. As used herein, "inactive state" can include any conditions in which the powertrain 102 is inoperable to power the vehicle 100. For example, the inactive state can include conditions in which the engine is off. In some arrangements, this can be determined by one or more vehicle systems that indicate that an ignition switch of the vehicle has been switched to an "off" and/or "accessory" position. Alternatively or in addition, one or more of the sensors 290 that are operatively connected to the controller(s) 250 can determine if the vehicle 100 has been switched form an active state to an inactive state. If it is determined that the vehicle 100 has been switched to an inactive state the method can continue to block 320.

At block 320, the HVAC intake mode can switched to a fresh mode. In one or more arrangements, such switching can be accomplished by, for example, using the intake mode switch(es) 240. For instance, if the intake mode switch(es) 240 were set to a recirculation mode air source when the vehicle 100 was turned off, the intake mode switch(es) 240 can be switched to the fresh mode air source. Further, if the intake mode switch(es) 240 were set in the fresh mode air source when the vehicle 100 was turned off, no action is taken. In some arrangements, the controller 250 can be configured to control the intake mode switch(es) 240 via the one or more actuators 280. The switching can occur at any suitable time after it is determined the vehicle 100 has been switched to an inactive state. For example, the switching can occur immediately after the vehicle 100 has been switched to an inactive state. In some arrangements, the switching can occur after a predetermined time period after the vehicle 100 has been switched to an inactive state. For example, the switching can occur about 60 seconds after the vehicle 100 is switched to an inactive state. After the HVAC intake mode is switched to a fresh mode air source, the method 300 can continue to block 330.

At block 330, it can be determined whether an ambient temperature is greater than a predetermined temperature value. In one or more arrangements, the predetermined temperature value can be stored in the data store(s) 260. In one or more arrangements, the controller 250 can receive an ambient temperature signal from the ambient temperature sensor(s) 292. The controller 250 can compare the received ambient temperature to the predetermined temperature value. The controller 250 can determine whether the ambient temperature is greater than, less than, or equal to the predetermined temperature value. In one non-limiting example, the predetermined temperature value can be about 32 degrees Fahrenheit. If it is determined that the ambient temperature is less than the predetermined temperature value, the method 300 can return to block 310 or the method 300 can end. If it is determined that the ambient temperature is greater than or equal to the predetermined temperature value, the method 300 can continue to block 340.

At block 340, it can be determined whether the compressor 212 was in operation prior to the vehicle 100 being switched to the inactive state. In one or more arrangements, the controller 250 can determine if the compressor 212 was in operation immediately prior to the vehicle 100 being switched to the inactive state. Alternatively or in addition, the controller 250 can determine if the compressor 212 was in operation during a predetermined time period (e.g., five minutes) prior to the vehicle 100 being switched to the inactive state.

In one or more arrangements, the controller 250 can determine if the compressor 212 was in operation based on flags stored in the data store(s) 260. As used herein, a "flag" can include any information stored in the data store(s) 260 indicative of a status of one or more vehicle systems, such as the compressor 212. In one or more arrangements, each time an operational status of the compressor 212 is changed (e.g., turned on or off), the status of a flag can be changed. Alternatively or in addition, each time the operational status of the compressor 212 is changed a new flag can be generated in the data store(s) 260. In one or more arrangements, the flag indicating an operational status of the compressor 212 can remain in the data store(s) 260 when the vehicle 100 is switched from an active state to an inactive state. If it is determined that the compressor 212 was not in operation prior to the vehicle 100 being switched to an inactive state, the method 300 can return to block 310, or the method 300 can end. If it is determined that the compressor 212 was in operation prior to the vehicle 100 being turned off, the method 300 can continue to block 350.

At block 350, it can be determined whether an evaporator temperature is rising. In one or more arrangements, the controller 250 can receive an evaporator temperature signal from the evaporator temperature sensor(s) 296. The controller 250 can determine a rate of change of the evaporator temperature by comparing the evaporator temperature over a period of time. In one or more arrangements, the evaporator temperature can be determined at two separate instances and compared. For example, a first evaporator temperature can be determined. Then, after a period of time, a second evaporator temperature can be determined. The first and second evaporator temperatures can be compared to determine if the evaporator temperature is rising. In one or more arrangements, a predetermined rate of change can be stored in the data store(s) 260. The controller 250 can compare the rate of change of the evaporator temperature to the predetermined rate of change. The controller 250 can determined whether the rate of change in the evaporator temperature is greater than or equal to the predetermined rate of change. As a non-limiting example, the predetermined rate of change can be about 10 degrees Celsius per 5 minutes. If it is determined that the rate of change of the evaporator temperature is less than the predetermined rage of change, the method 300 can return to block 310 or the method 300 can end. If it is determined that the rate of change in evaporator temperature is greater than or equal to the predetermined rate of change, the method 300 can continue to block 360.

At block 360, the blower(s) 230 can be activated. In one or more arrangements, the controller 250 can cause the blower(s) 230 to activate. When activated, the blower(s) 230 can blow air. The blower(s) can be positioned or caused to be positioned to blow air across the evaporator 216. In one or more arrangements, the blower(s) 230 can be activated at a predetermined power level. For instance, the blower(s) 230 can be activated at a low, medium, and/or high power level during the predetermined activation time. The blower(s) 230 can be activated at any suitable time. In one non-limiting example, the blower(s) 230 can be activated at a time about 30 minutes after it is determined that the power state of the vehicle 100 has been switched from the active state to the inactive state.

In one or more arrangements, the blower(s) 230 can be alternatingly activated and deactivated. In some instances, the blower(s) 230 can be activated for active periods and deactivated for inactive periods. When deactivated, the blower(s) 230 can be configured to not blow air, or can be configured to reduce the amount of air being blown. Thus, the inactive period can be a period of time in which the blower(s) 230 does not substantially blow air between the activated periods in which the blower(s) blow air. The inactive periods can be regular, irregular, or even random. For example, the inactive periods can be about ten minutes. In a non-limiting example, the blower(s) 230 can be activated for an active period of about 20 seconds to about 30 seconds at between inactive periods of about ten minutes.

In one or more arrangements, the periodic activation of the blower(s) 230 can last for a predetermined duration. For instance, the predetermined duration can be substantially equal to the total time of all of the active times and inactive times. The predetermined duration can be a period of time after the vehicle 100 has been turned off or relative to some other starting point or event. For example, the predetermined duration can be about 60 minutes. In such case, the blower(s) 230 could be activated to blow air for active periods between inactive periods for a total of about 60 minutes, such as after the vehicle 100 has been turned off. After activations of the blower(s) 230 for the predetermined duration, the method 300 can end. Alternatively, the method 300 can return to block 310.

In a non-limiting example, the blower(s) 230 can be activated for a first activation period, a second activation period, and a third activation period, with inactive periods in between. For instance, the first activation period can be for about 30 seconds. A first inactive period can be for about 10 minutes. The second activation period can be for about 30 seconds. A second inactive period can be for about 10 minutes. The third activation period can be for about 30 seconds. Thus, in this example, the predetermined duration can be about 20 minutes to about 23 minutes.

A non-limiting example of the operation of the vehicle 100 and the HVAC system 200 in accordance with the method 300 will now be described. For purposes of this example, the vehicle 100 can include an engine that is turned off after being operated with an AC system activated. For example, during operation of the vehicle 100, an occupant may have selected a desired temperature for the passenger compartment. If the temperature selected was lower than an internal temperature of the vehicle, as measured by the internal temperature sensor 294, the AC system 210 can be activated. The HVAC system 200 can include the controller 250 and the data store(s) 260. In some arrangements, the controller 250 and the data store(s) 260 can be part of a vehicle ECU, such as an HVAC ECU.

After the vehicle 100 is turned off, the HVAC system 200 can switch the intake mode switch 240 to a fresh mode air source. In one or more arrangements where the intake mode switch 240 was set to a recirculation mode air source or a partial recirculation mode air source, the controller(s) 250 can cause one or more of the actuators 280 to switch the intake mode switch 240. The switching to the fresh mode air source can be performed automatically in response to the vehicle being turned off, or it can be does responsive to receiving a user input.

The HVAC system 200 can determine whether an ambient temperature is greater than a predetermined temperature value. In one or more arrangements, the ambient temperature sensor 292 can sense the ambient temperature and provides the information to the controller 250. The controller 250 can compare the information received from the ambient temperature sensor 292 to a predetermined temperature value and/or other data stored in the data store(s) 260. In one or more arrangements, the predetermined temperature value can be a fixed value. For example, the predetermined temperature value can be a temperature value measured in degrees in any suitable temperature measurement scale (e.g., Fahrenheit, Celsius, etc.). In some arrangements, the predetermined temperature value can be a temperature of about 32 degrees Fahrenheit. In some arrangements, the predetermined temperature value can be selected to ensure the battery 104 of the vehicle will remain at an appropriate charged state during subsequent operations. For example, a temperature of 32 degrees Fahrenheit can be selected if performance of the battery 104 would be unacceptable at temperatures below freezing.

The controller 250 can determine whether the compressor 212 of the AC system 210 was in operation prior to the vehicle engine being turned off. In one or more arrangements, the controller 250 can access data stored in the data store(s) 260 to determine if the compressor 212 was in operation. For example, flags stored in the data store(s) operatively connected to the HVAC controller can indicate the past operation status of the compressor 212.

If the compressor 212 was in operation prior the vehicle engine being turned off, the controller 250 can determine whether or not an evaporator temperature is rising. In one or more arrangements, the evaporator temperature sensor 296 can sense the evaporator temperature and can provide the information to the controller 250. The controller 250 can compare the evaporator temperature over a period of time to determine a rate of change of the evaporator temperature. In some arrangements, the controller 250 can determine if the temperature is rising by comparing it to a predetermined rate of change stored in the data store(s) 260. For example, the predetermined temperature gradient can be about 2 degrees Fahrenheit per minute.

If the evaporator temperature is determined to be rising, the controller 250 can cause the blower(s) 230 to be activated to blow air across the evaporator 216. In one or more arrangements, the controller 250 can cause the alternating activation and/or deactivation of the blower(s) 230 to produce active periods and inactive. For example, the blower(s) 230 can be activated for active periods lasting from about 20 seconds to about 30 seconds. The activation of the blower(s) 230 can occur between inactive periods of about ten minutes. In one or more arrangements, the controller 250 can cause the blower(s) 230 to be activated periodically for a predetermined duration. For example, the blower(s) 230 can be activated between intervals for a predetermined duration of about 60 minutes.

In one or more arrangements, the activation of the blower(s) 230 can reduce, eliminate, and/or prevent condensation at or near the evaporator 216. The blower(s) 230 can be configured to blow and/or suck air such that air is in fluid contact with one or more outer surfaces of the evaporator 216. The air can reduce condensation on surfaces of the evaporator 216 by causing condensation to be blown off and/or evaporate. In some arrangements, the air blown across the evaporator 216 can prevent further condensation from forming by warming one or more surfaces of the evaporator 216. If left alone, condensation present on the evaporator 216 can provide a moist atmosphere that may capture odor particles within the HVAC system 200. If allowed to remain within the HVAC system, the odor particles can be blown into a cabin of the vehicle 100 when the HVAC is activated. By activating the blower(s) 230 as described herein, the odor particles can be reduced and/or eliminated before occupants re-enter the vehicle 100.

In some arrangements, the controller 250 can determine if a battery voltage of the battery 104 or power source 220 decreases below an acceptable battery voltage threshold. For instance, the controller 250 can receive battery voltage information from the battery sensor(s) 298. An acceptable battery voltage threshold can be stored in the data store(s) 260. For example, the acceptable battery voltage threshold can be about 11 volts. If the controller 250 determines that the determined battery voltage is below the acceptable battery voltage threshold, one or more operations of the HVAC system 200 can be terminated, discontinued, suspended, and/or disabled. For instance, the activation of the blower(s) 230 can be stopped if the battery voltage drops below the acceptable voltage.

It will be appreciated that arrangements described herein can provide numerous benefits, including one or more of the benefits mentioned herein. Arrangements described herein can reduce condensation within a vehicle HVAC system. For example, condensation present at an evaporator of an air conditioning system can be reduced after the vehicle is turned off. The reduction of condensation can eliminate odor within a passenger compartment of the vehicle. Further, the reduction of condensation can reduce and/or eliminate odors from being introduced within the vehicle. Arrangements described herein provide methods that operate after a vehicle has been turned off, providing convenience to an operator as the operator is not required to be present in the vehicle.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of reducing condensation within a heating, ventilating, and air conditioning (HVAC) system in a vehicle, the HVAC system including a compressor, an evaporator, and a blower, the method comprising:
determining whether a power state of the vehicle has been switched from an active state to an inactive state;
responsive to determining that the power state of the vehicle has been switched from the active state to the inactive state, causing a fresh mode air source to be selected for an intake of the blower;
determining whether an ambient temperature is greater than or equal to a predetermined temperature value;
determining whether the compressor was in operation prior to the vehicle having been switched from the active state to the inactive state;
determining whether a temperature of the evaporator of the HVAC system is rising, wherein the determining whether the temperature of the evaporator of the HVAC system is rising includes determining if a rate of change of the temperature of the evaporator is greater than or equal to a predetermined rate of change; and responsive to determining that the ambient temperature is greater than or equal to the predetermined temperature value, further responsive to determining that the compressor was in operation prior to the vehicle having been switched to the inactive state, further responsive to determining that a battery voltage is above an acceptable battery voltage threshold, and further responsive to determining that the temperature of the evaporator is rising at a predetermined rate of change while the compressor is in an inactive state, causing the blower to be activated such that air from the fresh mode air source is blown across the evaporator, wherein the blower is stopped by a controller if the battery voltage decreases below the acceptable battery voltage threshold.

2. The method of claim 1, wherein the predetermined temperature value is from 30 degrees Fahrenheit to 50 degrees Fahrenheit.

3. The method of claim 2, wherein the predetermined temperature value is 32 degrees Fahrenheit.

4. The method of claim 1, wherein the determining whether the compressor was in operation prior to the vehicle being switched from the active state to the inactive state includes analyzing a flag stored in a data store operatively connected to an HVAC controller, and wherein the flag indicates an operational status of the compressor.

5. The method of claim 1, wherein the predetermined rate of change is 10 degrees Celsius per 5 minutes.

6. The method of claim 1, wherein the causing the blower to be activated includes causing the blower to be alternated between active periods and inactive periods for a predetermined duration.

7. The method of claim 6, wherein each active period is from 20 seconds to 30 seconds.

8. The method of claim 7, wherein each inactive period is ten minutes.

9. The method of claim 8, wherein the predetermined duration is 60 minutes.

10. A method of reducing condensation within a heating, ventilating, and air conditioning (HVAC) system in a vehicle that has been switched to an inactive state, the HVAC system including a compressor, an evaporator, and a blower, the method comprising:

causing an intake mode switch to select a fresh mode air source intake for the HVAC system;

determining whether an ambient temperature is greater than or equal to a predetermined temperature value using data acquired from at least one ambient temperature sensor;

determining whether the compressor was in operation prior to the vehicle being switched to the inactive state;

determining whether a temperature of the evaporator is rising, wherein the determining whether the temperature of the evaporator is rising includes determining if a rate of change of the temperature of the evaporator is greater than or equal to a predetermined rate of change; and responsive to determining that the ambient temperature is greater than or equal to the predetermined temperature value, further responsive to determining that the compressor was in operation prior to the vehicle having been switched to the inactive state, further responsive to determining that a battery voltage is above an acceptable battery voltage threshold, and further responsive to determining that the temperature of the evaporator is rising at a predetermined rate of change while the compressor is in an inactive state, causing the blower to be activated such that air from the fresh mode air source is blown across the evaporator, wherein the blower is stopped by a controller if the battery voltage decreases below the acceptable battery voltage threshold.

11. The method of claim 10, wherein each active period is from 20 seconds to 30 seconds.

12. The method of claim 11, wherein each of the inactive periods is ten minutes.

13. The method of claim 12, wherein the predetermined duration is 60 minutes.

14. A vehicle heating, ventilating, and air conditioning (HVAC) system operable to reduce condensation within the HVAC system after a vehicle is switched from an active state to an inactive state, the system comprising:

a sensor system operable to sense an ambient temperature and to sense an evaporator temperature;

an intake mode switch to select a source of air for an intake for the HVAC system;

a compressor operable to increase a pressure of a refrigerant;

an evaporator;

a blower operable to blow air from the intake across the evaporator; and a controller operatively connected to the sensor system, the controller being programmed to initiate executable operations comprising:

causing the intake mode switch to select a fresh mode air source;

determining whether the ambient temperature is greater than or equal to a predetermined temperature value;

determining whether the compressor was in operation prior to the vehicle being turned to the off state;

determining whether the evaporator temperature is rising, wherein the determining whether the evaporator temperature is rising includes determining if a rate of change of the temperature of the evaporator is greater than or equal to a predetermined rate of change; and responsive to determining that the ambient temperature is greater than or equal to the predetermined temperature value, further responsive to determining that the compressor was in operation prior to the vehicle having been switched to the inactive state, further responsive to determining that a battery voltage is above an acceptable battery voltage threshold, and further responsive to determining that the temperature of the evaporator is rising at a predetermined rate of change while the compressor is in an inactive state, causing the blower to be activated such that air is blown across the evaporator, wherein the blower is stopped by the controller if the battery voltage decreases below the acceptable battery voltage threshold.

15. The system of claim 14, wherein the predetermined temperature value is 32 degrees Fahrenheit.

16. The system of claim 14, further including one or more data stores operatively connected to the controller, and wherein the determining whether the compressor was in operation prior to the vehicle being switched to the off state includes analyzing a flag stored the one or more data stores.

17. The system of claim 14, wherein the causing the blower to be activated includes causing the blower to be alternated between active periods and inactive periods for a predetermined duration.

18. The system of claim 17, wherein each active period is from 20 seconds to 30 seconds.

19. The system of claim 18, wherein each inactive period is ten minutes and the predetermined duration is 60 minutes.

* * * * *